Nov. 5, 1929.
L. H. CHURCH
1,734,202
CABLE CONNECTER
Filed Feb. 4, 1927
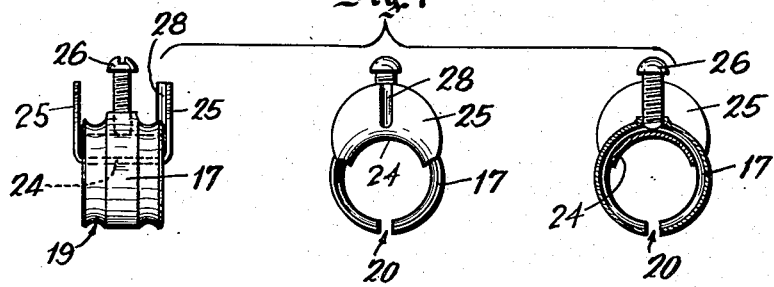
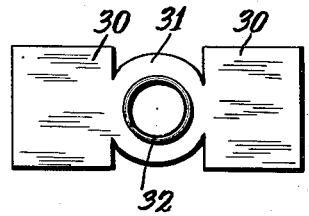
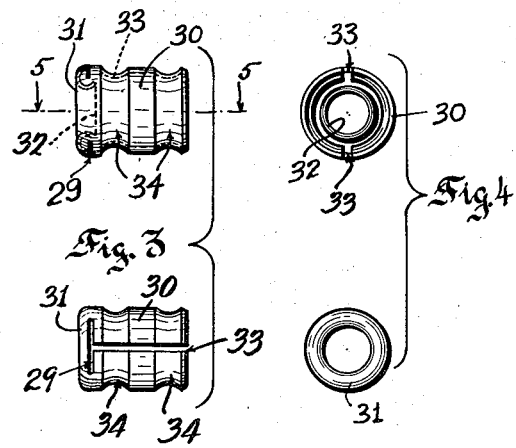
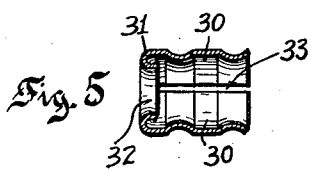
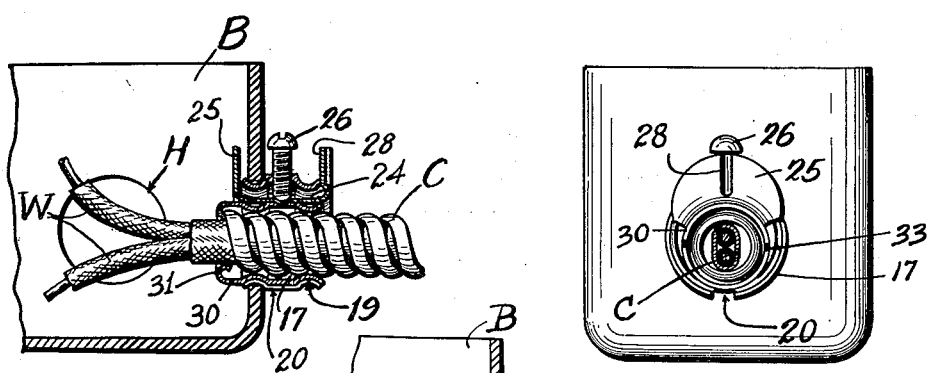
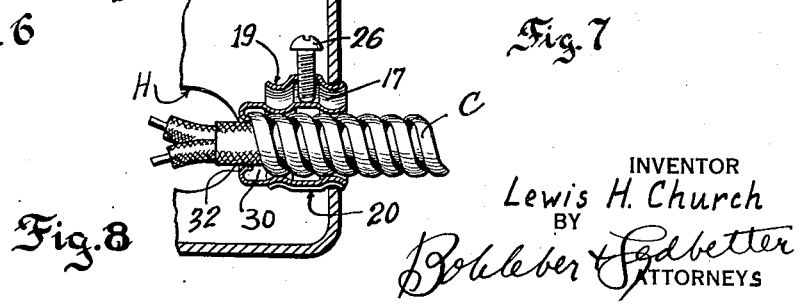
INVENTOR
Lewis H. Church
BY
Kohleber & Ledbetter
ATTORNEYS Patented Nov. 5, 1929

1,734,202

UNITED STATES PATENT OFFICE

LEWIS H. CHURCH, OF ROSELLE, NEW JERSEY, ASSIGNOR TO THE THOMAS & BETTS CO., OF ELIZABETH, NEW JERSEY, A CORPORATION OF NEW JERSEY

CABLE CONNECTER

Application filed February 4, 1927. Serial No. 165,785.

This invention relates to cable connecters and particularly to adapter connecters capable of universally anchoring cable of all sizes, shapes and kinds to electric outlet boxes, and more particularly relates to a bushing for use with my new cable connecter.

A main object of the invention is to produce a bushing capable of use with a cable connecter when armored cable is used, the bushing being so constructed and arranged as to be readily retained with the connecter to cap the ragged cable end and guard the wires against abrasion by the sharp edges of the severed ragged end of the metallic cable.

A further object is to produce a bushing for capping cable ends, the bushing being made in the form of a sleeve including slits therein if desired to permit expansion and contraction by which the bushing yields to readily slide over the end of an armored cable and by which it yields and snaps into engagement with the internal grooves of a sleeve type connecter and by which it gives under pressure of a movable clamp plate to grip and secure a cable in the connecter.

A further object is to produce a cable connecter composed of telescoping members, the inside part being a bushing to cover the armored cable end to grip and secure the cable to a box, while the outer member includes box hole edge anchorage means to establish an anchorage with a box, and operating means being carried with the outer member to bear against the inside part.

According to the present invention a longitudinally split expansible sleeve is adapted to be disposed within a cable connecter and receive the end of an armored cable, the retention of the cable in the connecter and the retention of the bushing sleeve on the cable end being effected by operating means, such as a clamp screw.

It is also an object of the invention to provide a bushing for use in connection with a cable connecter having a movable clamp plate adapted to deliver pressure to the cable by means of operating means to clamp the cable in the connecter and thereby cause the expansion and hence anchorage of the connecter within the knock-out opening or cable receiving hole of an outlet box. To this end the bushing is formed up into cylindrical shape and is longitudinally split to permit contraction thereof, but includes a full-fashioned end to cap over the ragged cable end. The bushing is adapted to be disposed within a connecter sleeve and receive an armored cable therein and to be contracted to grip the cable end by the pressure of a cable clamp plate which may be projected thereagainst by an operating screw.

The invention further seeks to insure the retention of the bushing in the cable end in a positive manner. To this end, in addition to the clamping action of the bushing sleeve on the cable, the bushing sleeve may be inwardly corrugated to cooperate with the peripheral groove found on armored cable and, if desired, may also be outwardly grooved to cooperate with the convex interior surface of the connecter sleeve formed by box hole anchorage grooves at each end of the connecter sleeve.

Another object of the invention is to produce a cable connecter bushing which is capable of manufacture in a simple and inexpensive manner and whereby the objects hereinbefore recited may be attained. Accordingly, the bushing is fashioned into cylindrical shape from a single stamping to comprise an annulus to bush the end of an armored cable and a sleeve formed with longitudinal diametrically disposed T-shaped slits or slots which permit the contraction of the sleeve about the cable, although the annulus is not split and therefore constitutes a rigid annular cover over the ragged end of the spiral metal ribbon constituting the cable armor.

Another object is to produce a bushing including a cable end covering annulus integral with a sleeve, said sleeve being sufficiently long to reach from end to end of a connecter sleeve and thereby telescope within a connecter sleeve.

These and other objects of the invention and the means for their attainment will be apparent from the following description taken in connection with the accompanying drawings illustrating an embodiment of the invention.

Figure 1 represents views in side, end, and transverse section, respectively, of a cable connecter to which the bushing according to the present invention is applicable.

Figure 2 shows a sheet metal stamping from which the bushing may be formed.

Figure 3 represents views in side elevation looking at the bushing in planes 90° apart to show the T-shaped slit in the bushing sleeve.

Figure 4 shows views of the bushing looking from each end.

Figure 5 is a sectional view of the bushing taken on the line 5—5 in Figure 3.

Figure 6 is a box assembly view illustrating the use of the bushing on armored cables in a connecter mounted in an electric outlet box.

Figure 7 is an outside box assembly view.

Figure 8 is a box assembly view of the bushing disposed within a connector with the clamp plate omitted and the clamp operating screw delivering pressure to the bushing to clamp the cable in the connecter, the bushing itself serving the purpose of a bearing clamp plate to protect the cable armor from the screw end.

In general electric outlet boxes B are made with knock-out openings or holes H to receive a cable C and connecter 17 which anchors the cable to the box B and electric wiring connections are made in the usual way inside the box with the wires W coming from the cable.

One suitable form of cable connecter to which the present invention in the bushing is applicable is illustrated at 17 in Figure 1 and may be formed of resilient metal, in sleeve form, having a box hole anchorage groove 19 proximate one or both ends. The ends of the stamping, from which the connecter member 17 is formed, come together to form a longitudinal slit 20 which permits the connecter member to be contracted, that is, its circumference reduced, for insertion and anchorage in a box hole H. The box hole edge is engaged, upon expansion of the connecter member 17, within one of the grooves 19, as shown in the box assembly views, to effect anchorage of the connecter member 17 in a box hole. While a grooved sleeve type part 17 is shown, other forms of connecter members and box anchorage means therefor may be used.

The sleeve 17 is adapted to receive a cable C, and within or upon this connecter may be mounted, if desired, a movable adapter cable bearing clamp plate 24, the ends of which are turned upwardly at substantially right angles to form sleeve shutters 25. The shutters 25 are of such dimensions as to close the end or ends of the sleeve 17, or that portion thereof unoccupied by the cable C, and close the box hole H against the admission of dirt or plaster into the interior of the box B and thus adapt different size cables to a standard size box hole. The shutters 25 also serve as positioning or guide means to prevent axial displacement of the cable clamp plate 24 as it is manipulated toward or away from the cable C and with respect to operating means such as the screw 26, which is threaded through a hole tapped in the connecter member 17, to drive the clamp plate 24 against the cable C and clamp it in the connecter and in so doing cause the expansion of the sleeve 17 and its anchorage grooves 19 to anchor the connecter in the box hole H.

If desired, one shutter 25 may be formed with a guide rib 28 to reciprocate within a slot formed in the connecter sleeve 17 to contribute to the guiding of the clamp plate 24 in its movement toward and away from the cable and to prevent rotation of the clamp plate 24 about the axis of the sleeve. Thus the shutters 25 together with a means 28 to prevent rotation, afford lateral motion between the sleeve connecter member 17 and adapter clamp 24—25 but prevent rotation and longitudinal displacement. A cable C inserted in the sleeve 17 is clamped in place by operation of the screw 26.

A bushing is provided for the end of the armored cable to protect the wires from abrasion by the sharp jagged severed end of the armored cable. According to the present invention the bushing is formed from a stamping wherein a pair of similar sleeve plates 30 are formed upon an annulus or bushing ring 31 having a central rounded aperture 32 through which the wires W are passed and against which the armored cable may abut. The plates 30 are shaped to cylindrical form and bent toward one another so that the proximate edges form diametrically opposite lengthwise slits 33 whereof the edges are spaced from one another a sufficient distance to permit contraction of the sleeve 30. The slit 33 joins a radial slit 29 defining the ring 31 so that two oppositely arranged T-slits 29—33 appear in the bushing sleeve 30.

The bushing sleeve 30 is also formed with peripheral grooves 34 by being pressed inwardly at these points so as to form in effect corrugations on the interior surface. A groove 34 is at each end of the bushing sleeve and coacts with the convex inner surface of the connecter sleeve 17 formed with the box hole anchorage groove 19 to prevent relative movement when the bushing is disposed within a cable connecter and the bushing is preferably of such diameter as to conveniently receive the end of an armored cable, one or more of the corrugations 34 then engaging the helical groove found on armored cable C.

Thus, due to the expansible nature of the bushing 30, the cable clamp plate 24 may be projected against the bushing sleeve 30 by the operating screw 26 to cause the contraction of the bushing sleeve and thereby engage the cable and hold it securely within a connecter 17 and at the same time cause the expansion of the connecter to engage a box hole edge H.

As observed in Figure 8, in some situations the clamp plate 24 may be eliminated and the operating screw 26 relied upon to contract the bushing sleeve 30 and clamp the cable within the connecter 17. The box anchorage grooves 34 cooperating with the box hole anchorage grooves 19 contribute to this end as do also the corrugations which insure against the withdrawal of a cable. It is a simple matter to bend out the shutters 25 and slip the clamp plate 24 through the split 20 of the connecter member 17 to dispose of the adapter clamp plate and thus assemble a connecter comprising two telescoping sleeves 17 and 30. The inner sleeve 30 in effect serves three purposes, first that of bushing or capping the end of a cable to protect the wires W, second that of affording a bearing clamp plate to deliver the pressure of the screw 26 onto the armor of the cable C and protecting the cable from the end of the screw, and third that of expanding the connecter member 17 in the box hole H. In these respects, my bushing and connecter are novel as regards the simplest form of the invention shown in Figure 8.

The combination connecter member 17 and bushing 30—31 telescopically fit together to produce a connecter of many uses. The connecter shown in Figure 1 may be used alone without a bushing for soft cable or fibre armored cable. It may be used without the adapter 24—25 but with bushing 30 in Figure 8 for large size armored cable C. It may be used with both the adapter 24—25 and bushing 30 for small size armored cable C in order that the shutter plate 25 cover up the end of the sleeve adjacent the small cable.

It is observed in Figure 8 that my novel connecter shown in Figure 1 may be mounted wholly within the box B so as to place the screw 26 inside the box. The bushing grooves 34 match or register with the connecter sleeve grooves 19 in either event. The bushing and connecter fill many uses and take the place of a variety of fittings heretofore required because they are capable of many different combinations and uses.

In any of the forms, adaptations or combinations explained, the screw 26 functions as operating means to clamp or grip the cable. It is also a cable clamp means to do the same thing because when the connecter is used without the clamp plate 24, as shown in Figure 8, the screw in that event bears on the flexible wall 30 of the bushing sleeve, hence the bushing sleeve merely takes the place of the clamp plate 24. The screw is therefore operating means to either actuate the clamp plate 30 or 24 as the case may be, or is itself clamp means since without either clamp plate 30 or 24, its end in reality will deliver direct pressure onto the cable to clamp and grip the cable in the connecter member 17 and expand the member 17 for anchorage in a box hole.

What I claim is:

1. A connecter member including box hole anchorage means, operating means carried with the connecter, and a separate bushing including means to attach it to an armored cable end upon engagement by said operating means.

2. A connecter comprising in combination, a sleeve including box hole edge anchorage means, a cable clamp plate separate from the sleeve, operating means to deliver pressure to the clamp plate, and a separate bushing adapted to be engaged by the cable clamp plate to fasten the bushing in the sleeve.

3. A connecter comprising in combination, a connecter sleeve including box hole edge anchorage means, a cable clamp plate separate from the sleeve, operating means to deliver pressure to the clamp plate, and a separate bushing annulus including a sleeve telescoped into the connecter sleeve and reaching from end to end thereof and adapted to be engaged by the cable clamp plate to fasten the bushing in the sleeve and grip a cable in the bushing.

4. A connecter comprising in combination, a connecter sleeve including box hole edge anchorage grooves, a separate cable clamp plate carried within the sleeve, a separate expansible bushing engaged by the cable clamp plate including a sleeve and annulus and said sleeve being provided with T-shaped slots, operating means carried with the connecter sleeve to deliver pressure to the clamp plate and cause the bushing sleeve to contract.

5. A cable connecter comprising in combination, a split sleeve connecter including box hole edge engaging means, operating means carried with the connecter to grip a cable and expand the split sleeve; and a bushing member carried within the split sleeve and including an expansible bushing sleeve integral with an annulus, and the expansible sleeve being contracted by the aforesaid operating means to grip a cable.

6. A cable connecter comprising in combination, a split sleeve connecter including box hole edge engaging means, operating means carried with the connecter to grip a cable and expand the split sleeve; and a bushing sleeve provided with T-shaped slits to render it expansible and define a full-fashioned annulus at the end, and said sleeve being telescoped into the sleeve connecter and contracted therein by the operating means to grip a cable.

7. A cable bushing comprising a flared annulus in the form of a continuous ring, a sleeve integral therewith; and said sleeve being provided with T-shaped slits by which said annulus is defined by the head of the T-shaped slit, and by which the shank of the T-shaped slit forms the sleeve into flexible sections to engage a cable end.

In testimony whereof I affix my signature.

LEWIS H. CHURCH.